(12) United States Patent
Ben Moshe et al.

(10) Patent No.: US 9,273,955 B2
(45) Date of Patent: Mar. 1, 2016

(54) THREE-DIMENSIONAL DATA ACQUISITION

(75) Inventors: Sagi Ben Moshe, Kiryat Byalik (IL);
Ron Kimmel, Haifa (IL); Michael Bronstein, Lugano (CH); Alex Bronstein, Haifa (IL)

(73) Assignee: Intel Corporation, Santa Clara, CA (US)

( * ) Notice: Subject to any disclaimer, the term of this patent is extended or adjusted under 35 U.S.C. 154(b) by 632 days.

(21) Appl. No.: 13/604,724

(22) Filed: Sep. 6, 2012

(65) Prior Publication Data
US 2013/0063559 A1 Mar. 14, 2013

Related U.S. Application Data

(60) Provisional application No. 61/532,120, filed on Sep. 8, 2011.

(51) Int. Cl.
| | |
|---|---|
| *H04N 13/02* | (2006.01) |
| *G01B 11/25* | (2006.01) |
| *H04N 13/04* | (2006.01) |
| *G06T 7/00* | (2006.01) |

(52) U.S. Cl.
CPC .............. *G01B 11/25* (2013.01); *G06T 7/0057* (2013.01); *H04N 13/0207* (2013.01); *H04N 13/0459* (2013.01); *G06T 2207/10028* (2013.01)

(58) Field of Classification Search
CPC .............. H04N 13/0048; H04N 13/02; H04N 13/0207; H04N 13/0459; G01B 11/25; G06T 7/0057; G06T 2207/10028
USPC .......................... 348/43, 27, 46; 382/232, 251
See application file for complete search history.

(56) References Cited

U.S. PATENT DOCUMENTS

| | | | |
|---|---|---|---|
| 2002/0001029 A1* | 1/2002 | Abe ................................ | 348/49 |
| 2007/0229850 A1* | 10/2007 | Herber .......................... | 356/604 |

OTHER PUBLICATIONS

Vieira, M., et al., "A Camera-Projector System for Real-Time 3D Video," Computer Vision and Pattern Recognition, 2005 IEEE Computer Society Conference on, IEEE Piscataway, N J, Jun. 25, 2005 (8 pages).*

* cited by examiner

*Primary Examiner* — Trang U Tran
(74) *Attorney, Agent, or Firm* — Trop Pruner & Hu, P.C.

(57) ABSTRACT

A projector illuminates an object, within the field of view of a camera, with a sequence of code patterns. The camera captures the illuminated object and provides object images to a decoder to convert the code patterns into code. A transition locator locates discontinuities in the code pattern images. A dequantizer reconstructs a range image from those discontinuities and said code.

19 Claims, 5 Drawing Sheets

THREE-DIMENSIONAL DATA ACQUISITION

CROSS REFERENCE TO RELATED APPLICATION

This is a non-provisional application based on provisional application Ser. No. 61/532,120, filed Sep. 8, 2011, hereby expressly incorporated by reference herein.

BACKGROUND

This relates to time-multiplexed structured (coded) light, and to methods for acquiring a three-dimensional structure of an object.

Coded light is an active triangulation method for three-dimensional (3D) geometry acquisition, in which the object of interest is illuminated by a time-multiplexed sequence of patterns, e.g., vertical or horizontal stripes of varying width, forming some binary (e.g. Gray) code. Using a camera calibrated with the projecting system, the 3D geometry is recovered by triangulation. The code enables a correspondence between the camera and the projector coordinate systems to be determined.

The object is illuminated with a rapidly changing sequence of patterns. Typically, the sequence of projected patterns consists of b binary code patterns, forming a one-dimensional Gray code. The object illuminated by these patterns forms a set of N×M images $I_0 \ldots, I_b$ captured by the camera. These images contain continuous gray levels (hereinafter assumed to have pixel values in the range [0, 255]) that are converted into values of 1 at illuminated pixels and 0 at dark pixels.

The binary code of length b is thus formed at each pixel and decoded, giving a reference to the location Y of the pixel in the one-dimensional system of coordinates of the projector. The intersection of the ray connecting the pixel with the optical center of the camera coordinate system and the plane in the projector coordinate system allows recovery of the three-dimensional world coordinate of the point seen at that pixel. This coordinate can be expressed as the distance R from the camera center and obtained by means of a spatially-dependent non-linear projection operator $R(x,y)=P(x,y)\{(x,y)\}$.

BRIEF DESCRIPTION OF THE DRAWINGS

Some embodiments are described with respect to the following figures.

DETAILED DESCRIPTION

The resolution of the three-dimensional object geometry, reconstructed by means of the coded light method, is defined by several factors including the number of bits of the code (number of patterns), and, the spatial resolution of the camera (number of pixels in the image). Assuming that every pixel can be either black (dark) or white (illuminated) implies that the code (and consequently the resulting reconstructed image) is quantized at levels proportional to the pixel size. This limitation may be removed by means of what is referred to as a dequantization filter.

Since the code is one-dimensional (e.g. vertical), in the following, one may assume one line of an image, fixing Y and omitting it in order to simplify the problem formulation.

Since the camera resolution is finite, the binarized image contains the code patterns with finite precision (up to a pixel size). Thus, the location of a code pattern transition from zero to one or vice versa (manifested in transitions in each line of the normalized image from a value $J_k(x)>127$ to a value below $J_k(x+1)<127$ or vice versa) is known at pixel precision, and the code line Y is constructed by holding the decoded value until the next transition (zero-order hold).

Furthermore, due to the property of the Gray code, a transition of one integer level in the decoded value Y is manifested as a transition from zero to one or vice versa only in one bit of the code (i.e., if $|Y(x+1)-Y(x)|=1$, there will be only one $k=0, \ldots, b$ such that $J_k(x)>127$, $J_k(x+1)<127$ or $J_k(x)<127$, $J_k(x+1)>127$).

Transitions of more than one integer level correspond to discontinuities in the scanned object, e.g. due to depth difference.

An algorithm may be based on the observation that the location of transitions of the code patterns can be determined with sub-pixel accuracy as:

$$x + \Delta x = x + \frac{|J_k(x) - 127|}{|J_k(x) - 127| + |J_k(x+1) - 127|};$$

and the corresponding real code value is $$Y(x + \Delta x) = \frac{1}{2}(Y(x+1) + Y(x)).$$

The algorithm replaces zero-order hold interpolation by a better interpolation that takes into consideration the sub-pixel transitions. Since in a sense the approach may achieve higher resolution than possible due to camera finite pixel size quantization, it may be called dequantization.

The scanned object is assumed to be a piece-wise smooth, i.e. its one-dimensional profile (corresponding to a line in the image captured by the camera) contains slowly varying code possibly interrupted by some discontinuities. There are two different ways to perform the dequantization: interpolate Y and then reconstruct R, or interpolate R directly.

For code (Y) dequantization, let $x_i$ denote the locations of sub-pixel pattern transitions (such that $|Y(\lfloor x_i \rfloor)-Y(\lceil x_i \rceil)|=1$, implying that there is a one-level transition in the code in the nearby integer pixel locations) and let $$y_i = Y(x_i) = \frac{1}{2}(Y\lfloor x_i \rfloor) - Y(\lceil x_i \rceil))$$

denote the code values at these points. Furthermore, let $e_j$ denote the discontinuity locations (transitions larger than one bit, where $|Y(\lfloor e_i \rfloor)-Y(\lceil e_i \rceil)|>1$). The problem of code dequantization of Y is to find the sequence of code values $\hat{Y}(n)$, $n=1$, N that is
1. interpolating the data points, $\hat{Y}(x_i) \approx y_i$,
2. smooth between pairs of adjacent edges $e_i$ and $e_{i+1}$;
3. edge-preserving, $|\hat{Y}(\lfloor e_i \rfloor)-\hat{Y}(\lceil e_i \rceil)|>1$.

To interpolated R directly, for range (R) dequantization, the dequantization of the range image is performed by computing the projections at sub-pixel locations, $r_i=R(x_i)=P(x_i)\{Y(x_i)\}$. The problem of dequantiation of R is to find the sequence of range values $\hat{R}(n)$, $n=1$, N that is
1. interpolating the data points, $\hat{R}(x_i) \approx r_i$;
2. smooth between pairs of adjacent edges $e_i$ and $e_{i+1}$;
3. edge-preserving.

There are different ways to perform Y or R dequantization, using any discontinuity-preserving interpolation method. For implementation convenience, such interpolation can be implemented as a one-dimensional edge-preserving filter. In particular, one may focus on a non-linear filter, computed using a sliding window of size 2K+1.

For Y dequantization, given a window defined on the interval [k−K, k+K]. $\hat{Y}(k)$ may be interpolated from a subset of the values of $Y(X')=\{y_i: k-K \le x_i \le k+K\}$ at locations $X'=\{x_i: k-K \le x_i \le k+K\}$ that do not fall across the edges (if X' is empty, it is set to X'={k} and respectively, Y'={Y(k)}). Then, $$e^+ \min_{j:k<e_j \le k-K} e_j$$

$$e^- \max_{j:k-K \le e_j < K} e_j$$

are the closest edges on the left and right around the center of the window (if there are no right or left edges in the window, setting $e^+$, $e^-$ to the values k+K and k−K, respectively), and let $$\eta(k) = \begin{cases} 1 & e^- < k < e^+ \\ 0 & k \ge e^+ \text{ or } k \le e^-. \end{cases}$$

be the indicator function of the continuous interval between the edges. Then, the filter output is defined as:

$$\hat{Y}(k) = \frac{\Sigma x_i \in X' \eta(k) G(k-x_i) y_i}{\Sigma x_i \in X' \eta(k) G(k-x_i)},$$

where G(t) is an interpolation kernel, for example, a Gaussian $G(t)=e^{-t2/2\sigma 2}$.

For R dequantization, given a window defined on the interval [k−K, k+K], one may interpolate $\hat{R}(k)$ from a subset of the values $R'=\{r_i: k-K \le x_i \le k+K\}$ that do not fall across the edges (if R' is empty, it is set to R(k)=P(k)Y(k)), and let $e^+$, $e^-$ be defined as previously. Then, a median filter output is defined as $\hat{Y}(k)$=median (R').

Figure 1:
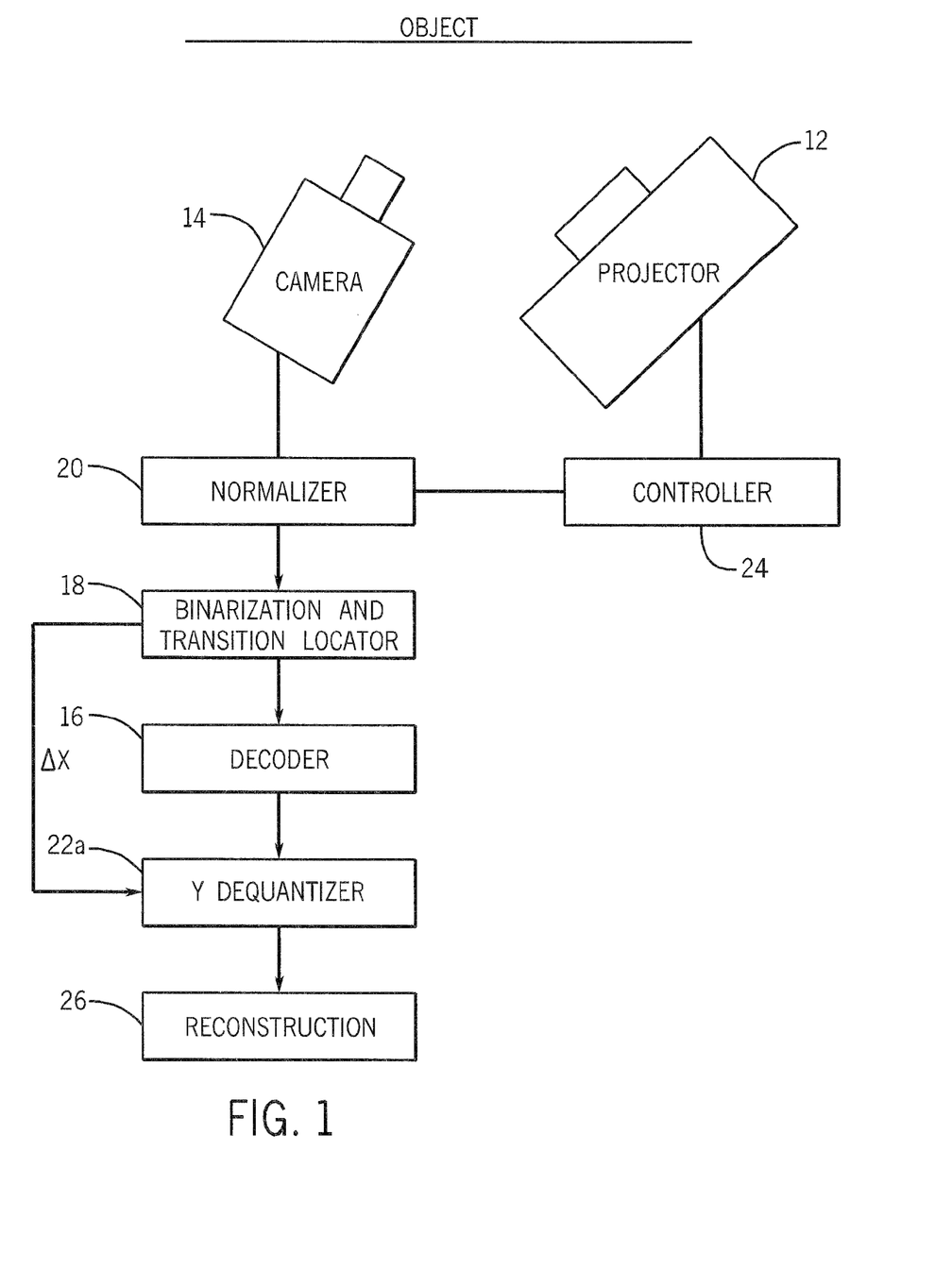
FIG. 1 is a schematic depiction of one embodiment.

Referring to FIG. 1, showing Y dequantization, an object may be illuminated by a projector 12 and the illuminated object may be captured by a camera 14. The output from camera is provided to a normalizer 20 and then to a binarization and transition locator 18. Then the signal is decoded in decoder 16. The normalizer 20, decoder 16, transition locator 18, dequantizer 22a and projector 12 may be coupled to a controller 24 such as a computer or other processor-based device.

The projector illuminates the object within the field of view of the camera with a sequence of code patterns. The camera captures the object illuminated by each code projected pattern.

A normalizer 20 accounts for varying reflectivity properties (albedo). Since the patterns are projected onto an object with potentially widely varying reflectivity properties (albedo) and due to background illumination, additional patterns $I_B$ (full dark) and $I_W$ (full bright) are used. Each pattern image $I_K$ is normalized at each pixel x,y according to the following formula:

$$I'_k(x,y) = \min\left\{\frac{\max\{0, I_k(x,y) - I_B(x,y)\}}{\max\{1, I_w(x,y) - I_B(x,y)\}}, 255\right\}.$$

Then the binarization 18 computes a binary image. A binary image may be computed, in one embodiment, by thresholding the normalized image at the level 127, $$J_k(x,y) = \begin{cases} 1 & I'_k(x,y) \ge 127, \\ 0 & I'_k(x,y) < 127. \end{cases}$$

The confidence of the binarization depends on the dynamic range at each pixel, and can be expressed as the difference $C(x,y)=Iw(x,y)-I_B(x,y)$. Pixels with $C(x,y)<\tau_{conf}$ (typically $5 \le \tau_{conf} \le 10$) may be considered unreliable.

The transition locator locates the discontinuities in the code pattern images. The transition locator finds transitions from high to low or from low to high values in the output of the image normalizer with subpixel resolution. The transition locator may be one-dimensional and may operate on each row or column of the image independently.

The decoder converts the code patterns into a code. The Gray code in the binarized images $J_0 \ldots, J_b$ is decoded obtaining an integer value Y(x,y) at each pixel, representing the number of a horizontal plane in projector system of coordinates.

The dequantizer first interpolates the values of the code at discontinuity locations (Δx) from the transition locator and then projects the resulting dequantized code to obtain the range image. The Y dequantizer 22a reconstructs the range image from the discontinuities in the code. The dequantizer may be one-dimensional, operating on each row or column of the image independently. In some embodiments, the dequantizer is a two-dimensional edge preserving filter. In some embodiments, the dequantizer is a two-dimensional bilateral filter. The dequantizer may also be in one-dimensional edge preserving filter. In still other embodiments, the dequantizer is a one-dimensional bilateral filter.

Reconstruction 26 is done next. From the intersection of the projector plane with a ray in the camera system of coordinates, the 3D coordinates of each pixel are recovered. These coordinates can be expressed as the distance from the camera center (range image) and obtained by means of a non-linear operator $$R(x,y) = P(x,y)\{Y(x,y)\} = \frac{\delta(x,y) \cdot Y(x,y) - \gamma(x,y)}{\alpha(x,y) - Y(x,y) \cdot \beta(x,y)},$$

where four position-dependent coefficients $a(x,y), \ldots, \delta(x,y)$ are obtained from calibration of the camera and the projector.

The code patterns in one embodiment are vertical or horizontal black and white strips of different width. In one embodiment, the code patterns form a Gray code.

Figure 2:
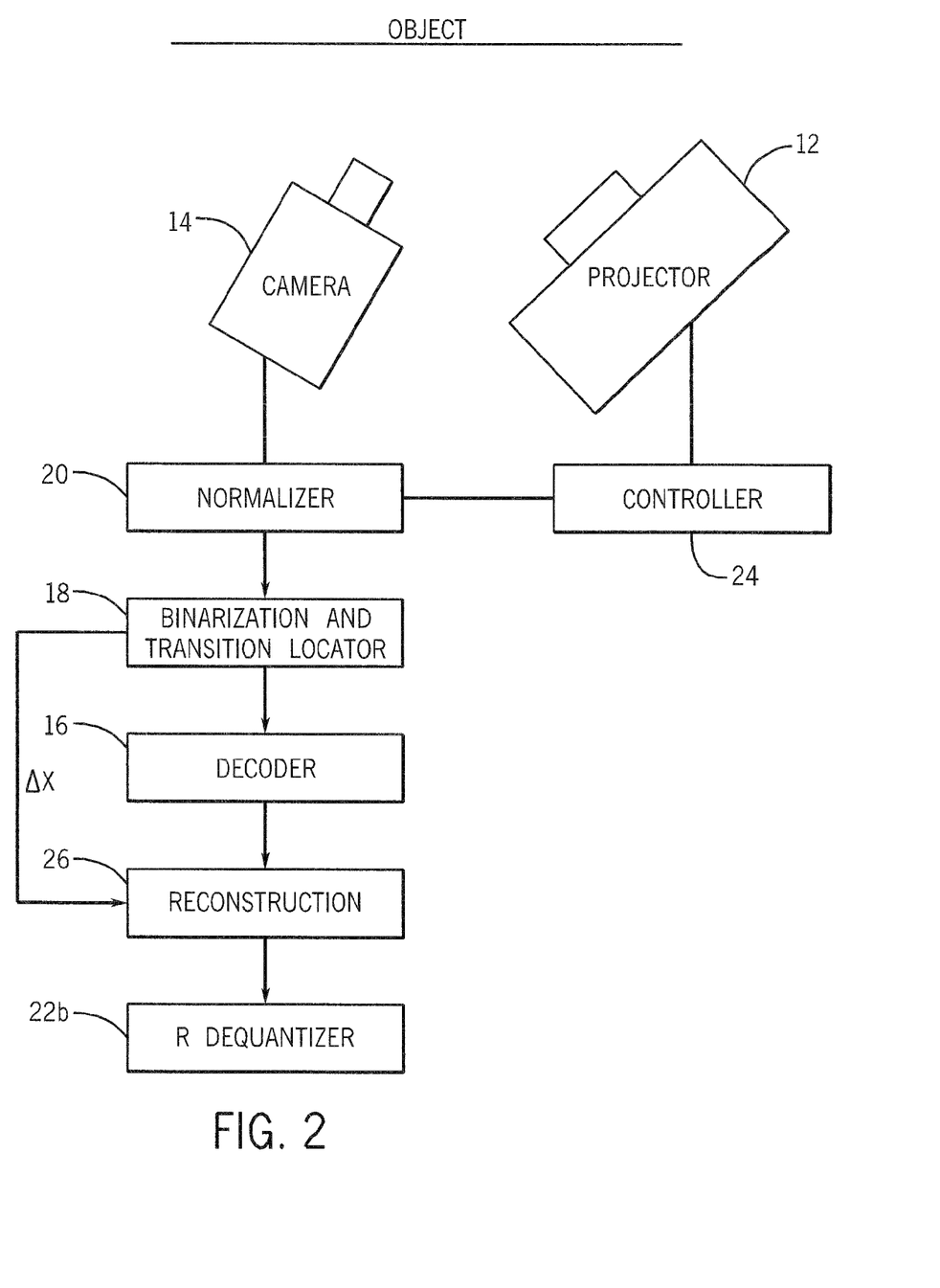
FIG. 2 is a schematic depiction of another embodiment.

In another embodiment, shown in FIG. 2, the R dequantizer 22b projects the values of the code at discontinuity locations and then interpolates the resulting range values to obtain the dequantized image. In this embodiment R dequantization occurs after reconstruction.

Figure 3:
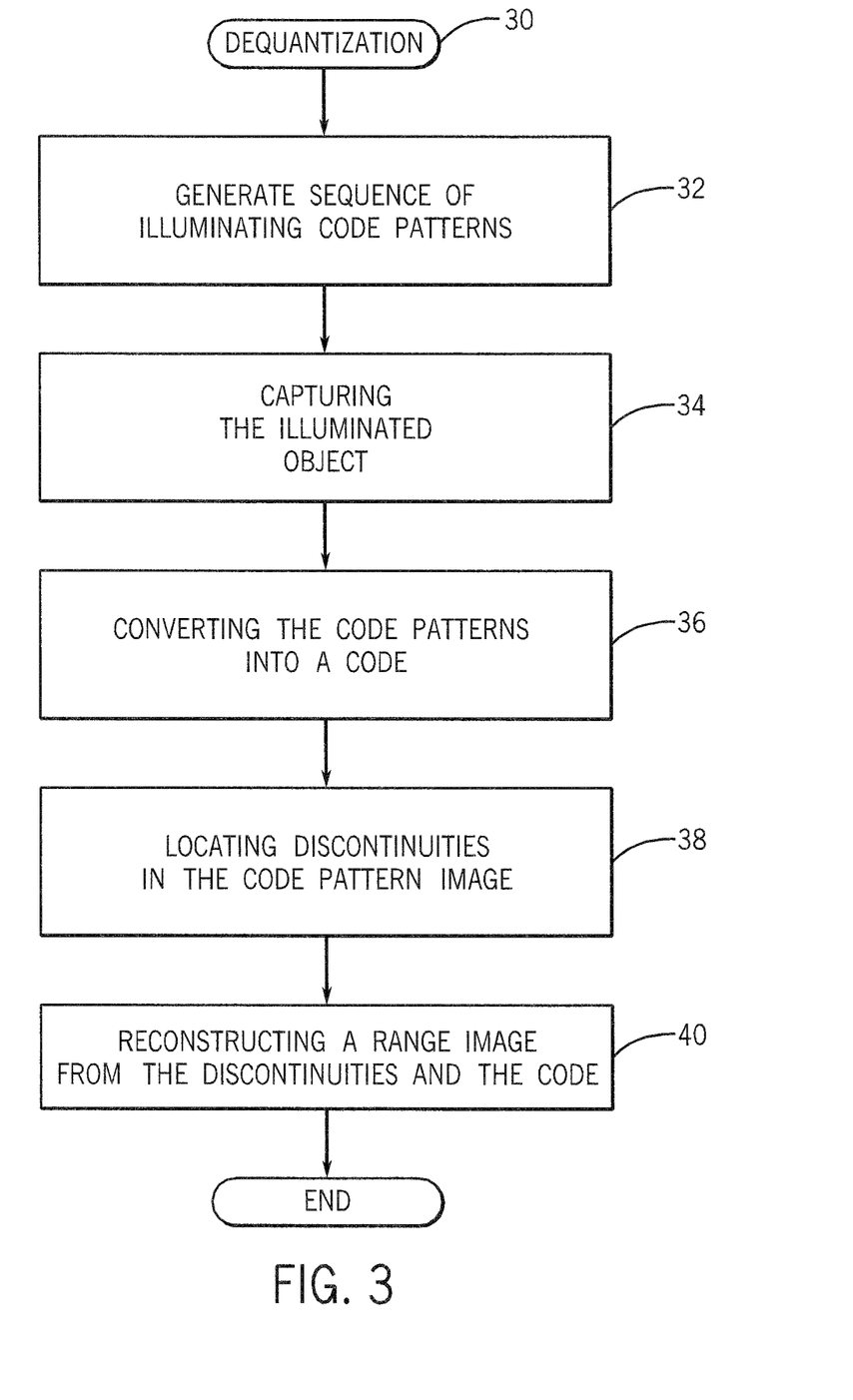
FIG. 3 is a flow chart for one embodiment.

A dequantization sequence 30, shown in FIG. 3, may be implemented in software, firmware and/or hardware. In software and firmware embodiments it may be implemented by computer executed instructions stored in one or more non-transitory computer readable media such as magnetic, optical or semiconductor storages.

The sequence 30 begins by generating a sequence of illuminating code patterns using the projector 12 as indicated in block 32. Then the illuminated object is captured using the camera 14 as indicated in block 34. The illuminated code patterns are then converted into a code as indicated in block 36. Discontinuities in the code pattern image are located as indicated in block 38. Then a range image is reconstructed from the discontinuities and the code as indicated in block 40.

In some embodiments, the sequence 30 may be implemented by the controller 24, and the instructions may be stored within the controller 24 or within a memory coupled to the controller 24 in some embodiments.

Figure 4:
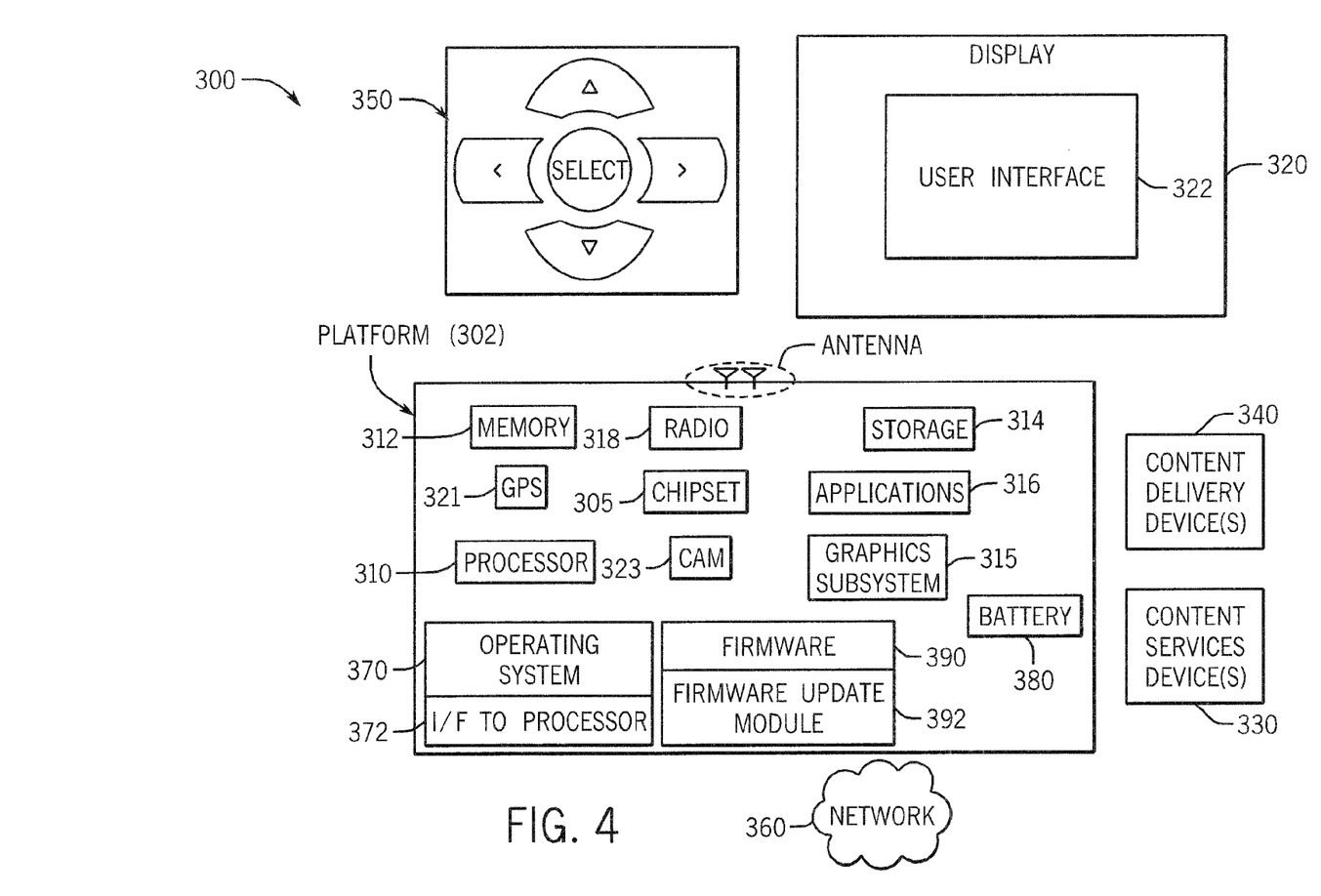
FIG. 4 is a system depiction for one embodiment.

FIG. 4 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

Figure 5:
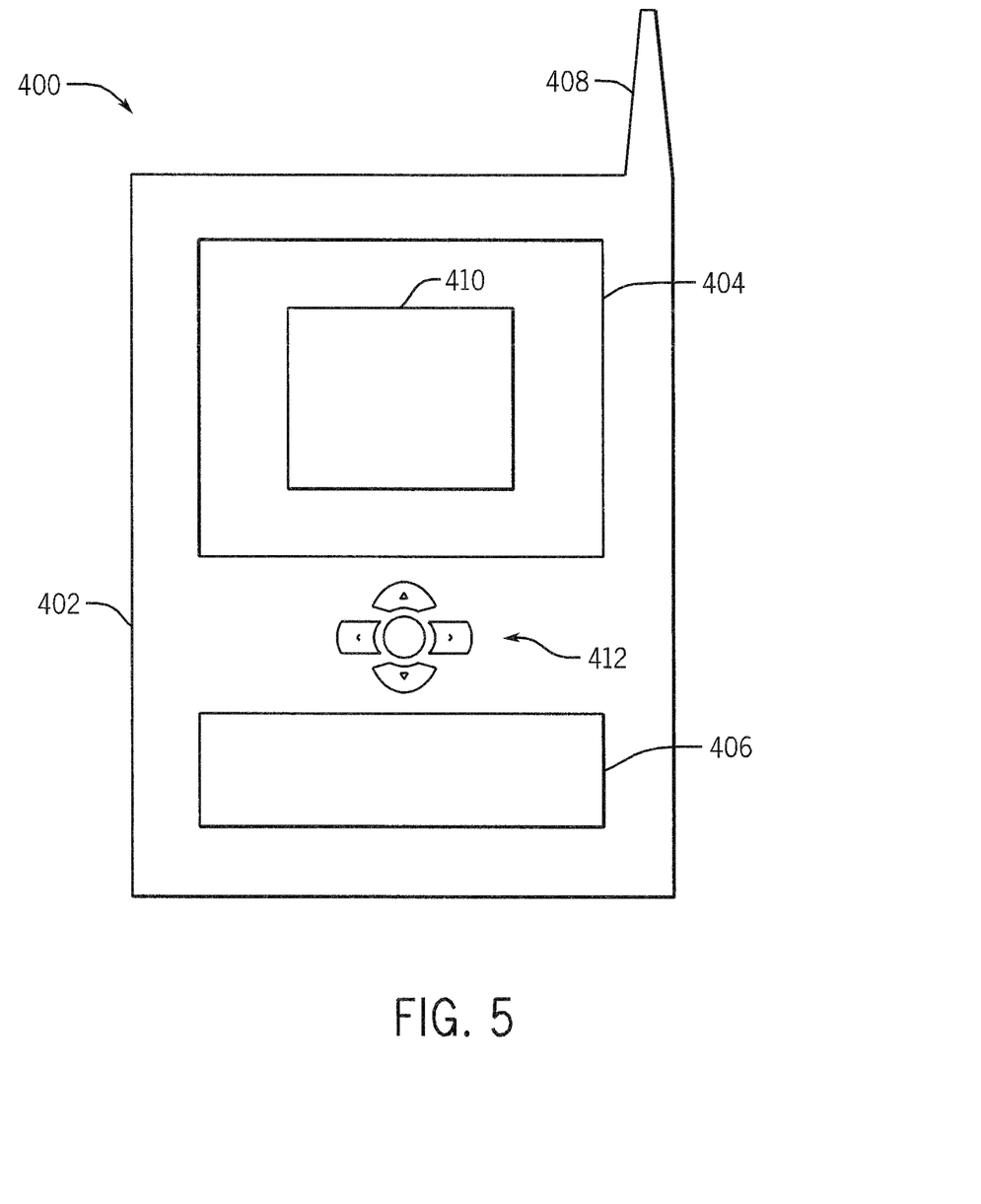
FIG. 5 is a front elevational view of one embodiment.

As described above, system 700 may be embodied in varying physical styles or form factors. FIG. 5 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequences shown in FIG. 2 in software and/or firmware embodiments.

As shown in FIG. 5, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A three-dimensional data acquisition system, comprising:
   at least one camera and at least one projector, said projector to illuminate the object within the field of the view of the camera with a sequence of code patterns, said camera to capture images the object illuminated by each projected pattern;
   a decoder to convert the code patterns into a code;
   a transition locator to locate discontinuities in the code pattern images; and
   a dequantizer to reconstruct a range image from said discontinuities and code and to project the values of code at discontinuity locations and then interpolate the resulting range values to obtain the dequantized range image.

2. A system according to claim 1, wherein the code patterns are vertical or horizontal black and white stripes of different width.

3. A system according to claim 2, wherein the code patterns form the Gray code.

4. A system according to claim 1, wherein the transition locator further includes an image normalizer.

5. A system according to claim 4, wherein the transition locator to find transitions from high to low or from low to high value in the output of image normalizer with subpixel resolution.

6. A system according to claim 1, wherein the transition locator is one-dimensional and operates on each row or column of the image independently.

7. A system according to claim 1, wherein the dequantizer is one-dimensional and operates on each row or column of the image independently.

8. A system according to claim 7, wherein the dequantizer is a one-dimensional edge-preserving filter.

9. A system according to claim 8, wherein the dequantizer is a one-dimensional bilateral filter.

10. A system according to claim 1, wherein the dequantizer is a two-dimensional edge-preserving filter.

11. A system according to claim 10, wherein the dequantizer is a two-dimensional bilateral filter.

12. A computer-implemented method method comprising: at least one camera and at least one projector, said projector to illuminate the object within the field of the view of the camera with a sequence of code patterns, said camera to capture images the object illuminated by each projected pattern;
    converting a sequence of code pattern images projected on object into a code;
    locating discontinuities in the code pattern images;
    reconstructing a range image from said discontinuities and code by projecting the values of code at discontinuity locations and then interpolating the resulting range values to obtain the dequantized range image.

13. The method of claim 12 including finding transitions from high to low or from low to high value with subpixel resolution.

14. The method of claim 12 wherein locating discontinuities includes operating on each row or column of the image independently.

15. The method of claim 12 wherein reconstructing includes operating on each row or column of the image independently.

16. One or more non-transitory computer readable media storing instructions to enable a computer to perform a sequence comprising: at least one camera and at least one projector, said projector to illuminate the object within the field of the view of the camera with a sequence of code patterns, said camera to capture images the object illuminated by each projected pattern;
   converting a sequence of code pattern images projected on object into a code;
   locating discontinuities in the code pattern images; and
   reconstructing a range image from said discontinuities and code by reconstructing includes projecting the values of code at discontinuity locations and then interpolating the resulting range values to obtain the dequantized range image.

17. The media of claim 16, the sequence further including finding transitions from high to low or from low to high value with subpixel resolution.

18. The media of claim 16, the sequence further including locating discontinuities includes operating on each row or column of the image independently.

19. The media of claim 16, the sequence further including reconstructing includes operating on each row or column of the image independently.

* * * * *

UNITED STATES PATENT AND TRADEMARK OFFICE
CERTIFICATE OF CORRECTION

PATENT NO. : 9,273,955 B2  
APPLICATION NO. : 13/604724  
DATED : March 1, 2016  
INVENTOR(S) : Sagi Ben Moshe et al.

Page 1 of 1

It is certified that error appears in the above-identified patent and that said Letters Patent is hereby corrected as shown below:

Claims  
Column 10, claim 12, line 42: delete "method."  
("method" appears twice in line 42)

Signed and Sealed this  
Third Day of May, 2016

Michelle K. Lee  
*Director of the United States Patent and Trademark Office*